(12) United States Patent
Snow

(10) Patent No.: US 9,644,544 B2
(45) Date of Patent: May 9, 2017

(54) SPRING BIASED EXHAUST VALVE ASSEMBLY

(71) Applicant: Vconverter Corporation, Whitmore Lake, MI (US)

(72) Inventor: Scott T. Snow, Commerce, MI (US)

(73) Assignee: Vconverter Corporation, Whitmore Lake, MI (US)

( * ) Notice: Subject to any disclaimer, the term of this patent is extended or adjusted under 35 U.S.C. 154(b) by 60 days.

(21) Appl. No.: 14/922,246

(22) Filed: Oct. 26, 2015

(65) Prior Publication Data

US 2016/0123240 A1    May 5, 2016

Related U.S. Application Data

(60) Provisional application No. 62/074,204, filed on Nov. 3, 2014, provisional application No. 62/101,628, filed on Jan. 9, 2015.

(51) Int. Cl.

| | |
|---|---|
| *F16K 21/02* | (2006.01) |
| *F02D 9/04* | (2006.01) |
| *G05D 7/01* | (2006.01) |
| *F01N 1/16* | (2006.01) |

(52) U.S. Cl.
 CPC ............... *F02D 9/04* (2013.01); *F16K 21/02* (2013.01); *F01N 1/165* (2013.01); *G05D 7/0126* (2013.01)

(58) Field of Classification Search
 CPC ..... F02D 9/04; F02D 9/08; F02D 9/12; F16K 21/02; F16K 17/044; F01N 1/165; G05D 7/0126

USPC .......... 137/528, 529, 540, 542, 543, 543.15; 138/46; 251/337

See application file for complete search history.

(56) References Cited

U.S. PATENT DOCUMENTS

| | | | |
|---|---|---|---|
| 1,163,128 A | 12/1915 | Brauer | |
| 4,822,008 A * | 4/1989 | Winkler | ............... F16H 7/1281 267/174 |
| 4,903,486 A * | 2/1990 | Finkle | ..................... F01N 1/165 181/236 |
| 5,489,753 A | 2/1996 | Gibel | |
| 5,551,674 A * | 9/1996 | Johnsen | ............... B60G 17/021 267/168 |
| 7,182,171 B2 | 2/2007 | Weinert et al. | |
| 2006/0249328 A1 | 11/2006 | Ichikawa et al. | |

(Continued)

FOREIGN PATENT DOCUMENTS

| | | |
|---|---|---|
| EP | 1930561 | 11/2008 |
| GB | 752641 | 7/1956 |
| WO | 2015104907 | 7/2015 |

*Primary Examiner* — Marina Tietjen
*Assistant Examiner* — Paul J Gray
(74) *Attorney, Agent, or Firm* — Wood, Herron & Evans, LLP

(57) ABSTRACT

An exhaust valve assembly comprises a housing having a central axis. A ram assembly moves along a shaft fixed inside a hollow interior of the housing. Downstream movement of the ram assembly increases the size of the valve opening, allowing additional exhaust gases to pass through the interior of the housing. Springs maintain the ram assembly in a position in which exhaust gases may pass around the ram assembly. Sufficient force on the ram assembly from exhaust gases compresses at least one spring allowing the ram assembly to move downstream, thereby allowing additional exhaust gases to pass through the interior of the housing.

20 Claims, 6 Drawing Sheets

(56) References Cited

U.S. PATENT DOCUMENTS

| | | | |
|---|---|---|---|
| 2007/0044848 A1* | 3/2007 | Norman | F16K 15/063 137/542 |
| 2008/0271794 A1* | 11/2008 | Leemhuis | G05D 7/0133 137/540 |
| 2015/0276001 A1 | 10/2015 | Keil et al. | |

* cited by examiner

SPRING BIASED EXHAUST VALVE ASSEMBLY

CROSS REFERENCE TO RELATED APPLICATIONS

This application claims the benefit of the filing of U.S. Provisional Patent Application Ser. Nos. 62/074,204 filed Nov. 3, 2014 and 62/101,628 filed Jan. 9, 2015. Each of these applications is fully incorporated by reference herein.

FIELD OF THE INVENTION

The present invention relates to an exhaust valve assembly for use in an exhaust system.

BACKGROUND OF THE INVENTION

Many exhaust valves today are located in mufflers. Installing an exhaust valve inside a muffler is a difficult task. Due to many moving parts and tight tolerances, existing exhaust valves are difficult and expensive to manufacture.

Many exhaust valves are butterfly valves inside a flow path which create unwanted noise. Such noise may be due to metal on metal contact and/or a failure of the plate inside the muffler to move to a desired orientation. Another problem with existing butterfly valves is failure due to component wear. Such components include bushings, shafts and springs.

Conventional exhaust valve plates are designed to close at idle or low engine speeds, and open progressively inside a flow path, such as a pipe, as the engine speed and exhaust gases increase. Consequently, the angle of the valve plate relative to the tube in which the valve plate is located changes depending upon the speed of the engine. For example, when the engine is idling, the valve plate is positioned generally perpendicular to the exhaust flow, and when the engine operates at full open throttle, the valve plate is positioned generally parallel the exhaust flow. Engine noise may be reduced due to sound waves being deflected off the valve plate when the engine is at idle because of the position of the valve plate, generally perpendicular to the exhaust flow. On the other hand, engine noise may undesirably increase due to sound waves not being deflected off the valve plate when the engine is at higher speeds because of the position of the valve plate, more parallel to the exhaust flow in the flow path.

Therefore, it is one objective of the present invention to maintain the position of the valve plate of an exhaust valve in a position generally perpendicular to the exhaust flow to decrease unwanted engine noise at all engine speeds.

It is another objective of the present exhaust valve assembly to increase the efficiency of an exhaust system in which the exhaust valve assembly is used, such as increasing fuel efficiency and/or emissions quality.

It is another objective of the present exhaust valve assembly, when used downstream of a catalytic converter, to increase the efficiency of the catalytic converter.

It is another objective of the present exhaust valve assembly to provide a hinge-less, lever-less valve with few moving parts less expensive to manufacture than existing exhaust valves and more reliable.

SUMMARY OF THE INVENTION

The present invention provides an improved exhaust valve assembly for reducing engine noise. The exhaust valve assembly comprises a housing, first and second struts inside the housing; a ride shaft extending between the struts, a ram assembly movable relative to the ram shaft and at least one spring surrounding the ride shaft for controlling the position of the ram assembly. The position of the ram assembly controls how much exhaust gas may flow through the valve assembly. It is within the contemplation of the present invention that the present invention not be limited to one ride shaft; two or more ride shafts being used.

In one embodiment, the housing has a central axis, an inlet portion, an outlet portion and a middle portion between the inlet and outlet portions. The middle portion of the housing may include tapered portions between a central portion of a fixed diameter and the inlet and outlet portions, the shape of the housing assisting in controlling the flow of exhaust gases through the valve assembly.

A ride shaft extends between one or more struts inside the housing along the central axis of the housing. In one embodiment, a first strut is located in the inlet portion of the housing and a second strut located in the outlet portion of the housing. A ram assembly is movably mounted on the ride shaft. The ram assembly comprises a ram plate and a retainer secured to the ram plate for retaining an inlet spring to the ram plate. The ram plate and retainer have aligned central openings. The ride shaft passes through the aligned central openings of the ram plate and retainer. In some applications, the retainer of the ram assembly may be omitted or may be in a different configuration than shown to provide linear motion of the ram plate along the axis of the housing.

The valve assembly has at least one resistor, such as a spring or any mechanically/electronically driven device. In most embodiments, the valve assembly has at least two resistors or springs: at least one inlet spring and at least one outlet spring, each spring surrounding the ride shaft. In one embodiment, the valve assembly has one inlet spring and one outlet spring. The upstream or inlet spring has convolutions of different diameters, a portion of the inlet spring being sandwiched between the ram plate and the retainer. The downstream or outlet spring has an upstream end abutting a downstream end of the inlet spring and a downstream end abutting the second strut. The compression/expansion of the outlet spring controls the position of the ram assembly and, therefore, the distance between the ram plate and the housing wall. The greater this distance, the greater the flow rate of exhaust gases through the valve assembly, due in part to the shape of the housing.

The ram assembly is maintained in a first position in the inlet portion of the housing, the perimeter of the ram plate being spaced from the inlet portion of the housing to allow exhaust gases to pass through the valve assembly. In one embodiment, the ram assembly is maintained in the first position by at least one spring. When pressure on the ram plate from the exhaust gases reaches a threshold level, the force on the ram plate from the exhaust gases overcomes the bias of the spring resistance, moving the ram assembly downstream inside the housing to a second position downstream of the first position inside the housing, allowing additional exhaust gases to move through the housing.

Explained another way, the exhaust valve assembly comprises a housing having a hollow interior and a central axis. The housing may be tapered between a central or expanded portion and the inlet and outlet portions. The housing shape assists in achieving the desired flow of exhaust gas through the valve assembly. At least one strut is located in the housing interior. A ride shaft is supported by the strut or struts inside the interior of the housing.

The valve assembly further comprises a ram assembly comprising a ram plate and a retainer. The ride shaft extends through the ram assembly. The valve assembly further comprises an inlet spring and an outlet spring. In one embodiment, the inlet spring has convolutions of different diameters, and the outlet spring has convolutions of the same diameter. However, either spring may have any number of convolutions of different diameters in any desired configuration. The inlet spring extends between one of the struts in the housing interior and the outlet spring. A portion of the inlet spring is sandwiched between the ram plate and the retainer. The outlet spring abuts the inlet spring at one end and a second strut in the housing interior at a downstream end of the housing. The ride shaft passes through the convolutions of both springs. The ram assembly is maintained in a first position in the housing interior by at least one of the springs. In its first position, the perimeter of the ram plate of the ram assembly may or may not be spaced from the housing. In the event spacing is present, such spacing allows some exhaust gases to pass through the valve assembly until force on the ram assembly from the exhaust gases compresses at least one spring and moves the ram assembly downstream inside the housing interior, allowing more exhaust gases to move through the valve assembly.

To this end, and in accordance with principles of the present invention, the exhaust valve assembly comprises a housing having a central axis and a hollow interior. A first strut is located in an inlet chamber of the housing and a second strut is located in an outlet chamber of the housing. A ride shaft extends between the struts inside the housing interior co-axial with the central axis of the housing. A ram assembly comprises a ram plate and a retainer, the ride shaft extending through the ram assembly. An inlet spring surrounds the ride shaft and has convolutions sandwiched between the ram plate and the retainer. An outlet spring surrounds the ride shaft downstream of the inlet spring. The ram assembly is maintained in a first position in the inlet chamber of the housing interior, the perimeter of the ram plate being spaced from a wall of the housing until pressure on the ram plate from the exhaust gas compresses the outlet spring and moves the ram assembly downstream inside the interior of the housing, thereby allowing additional exhaust gases to move through the interior of the housing.

By virtue of the foregoing, there is thus provided an improved exhaust valve assembly which has few moving parts. The characteristics of the springs determine the pressure necessary to move the ram assembly downstream, thereby increasing the spacing between the housing and the perimeter of the ram plate.

During movement of the ram assembly between its first/closed and second/open positions, the ram or valve plate remains perpendicular to the housing central axis. The capability of the ram plate to remain in such a position in which the exhaust gases push against the ram plate in a perpendicular direction provides unique sound control. The sound waves moving downstream in the housing interior interfere with or cancel the sound waves bounced off the ram plate and moving upstream inside the housing interior. The noise reduction of the present invention at all engine operating speeds is superior to known exhaust valve assemblies.

The exhaust valve assembly of the present invention may be "tuned", i.e., shaped or sized to fit any particular engine or exhaust system. This flexibility may be achieved quickly and relatively inexpensively by changing the size and/or shape of the housing and/or ram assembly.

These and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE DRAWINGS

Figure 1:
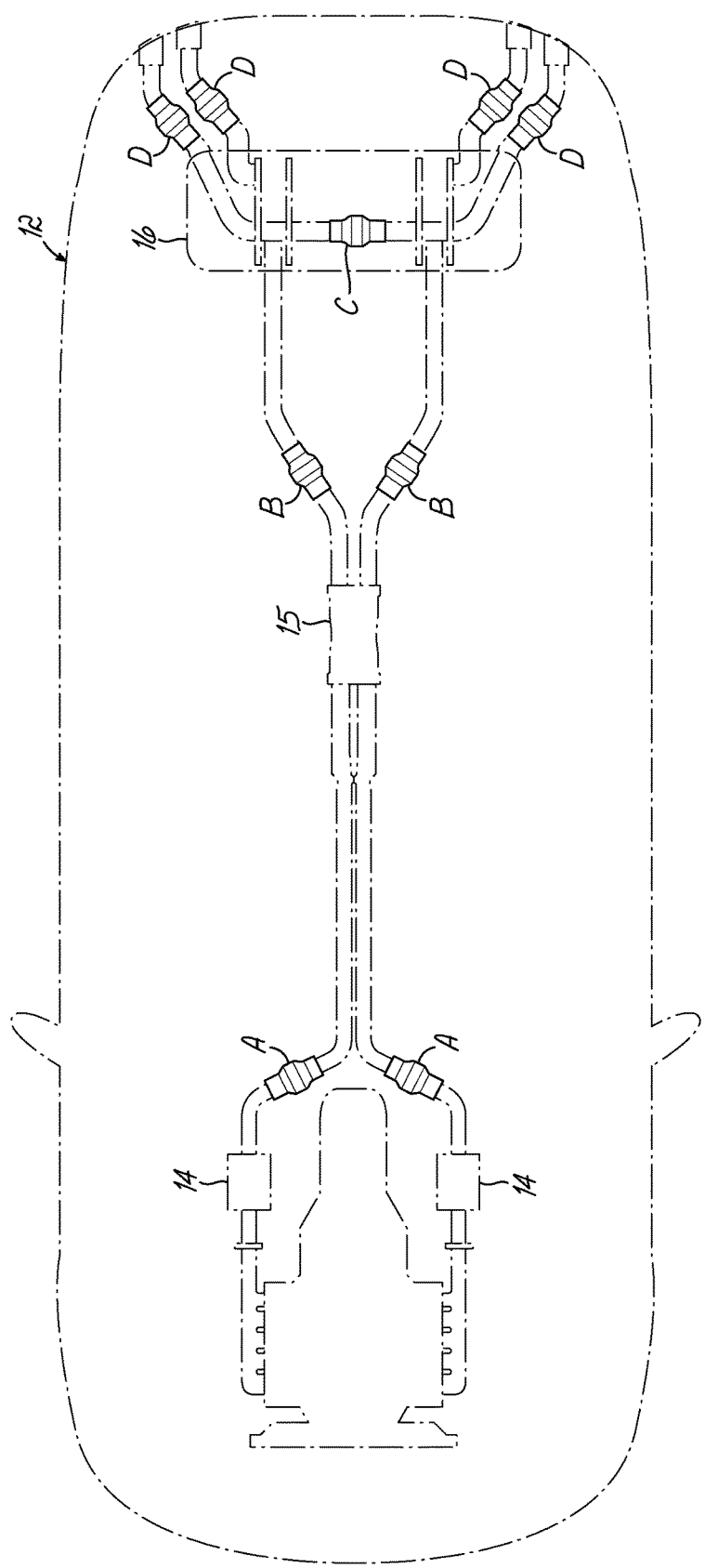
FIG. 1 is a top view of an automobile showing different possible locations for the valve assembly of the present invention.
Figure 2:
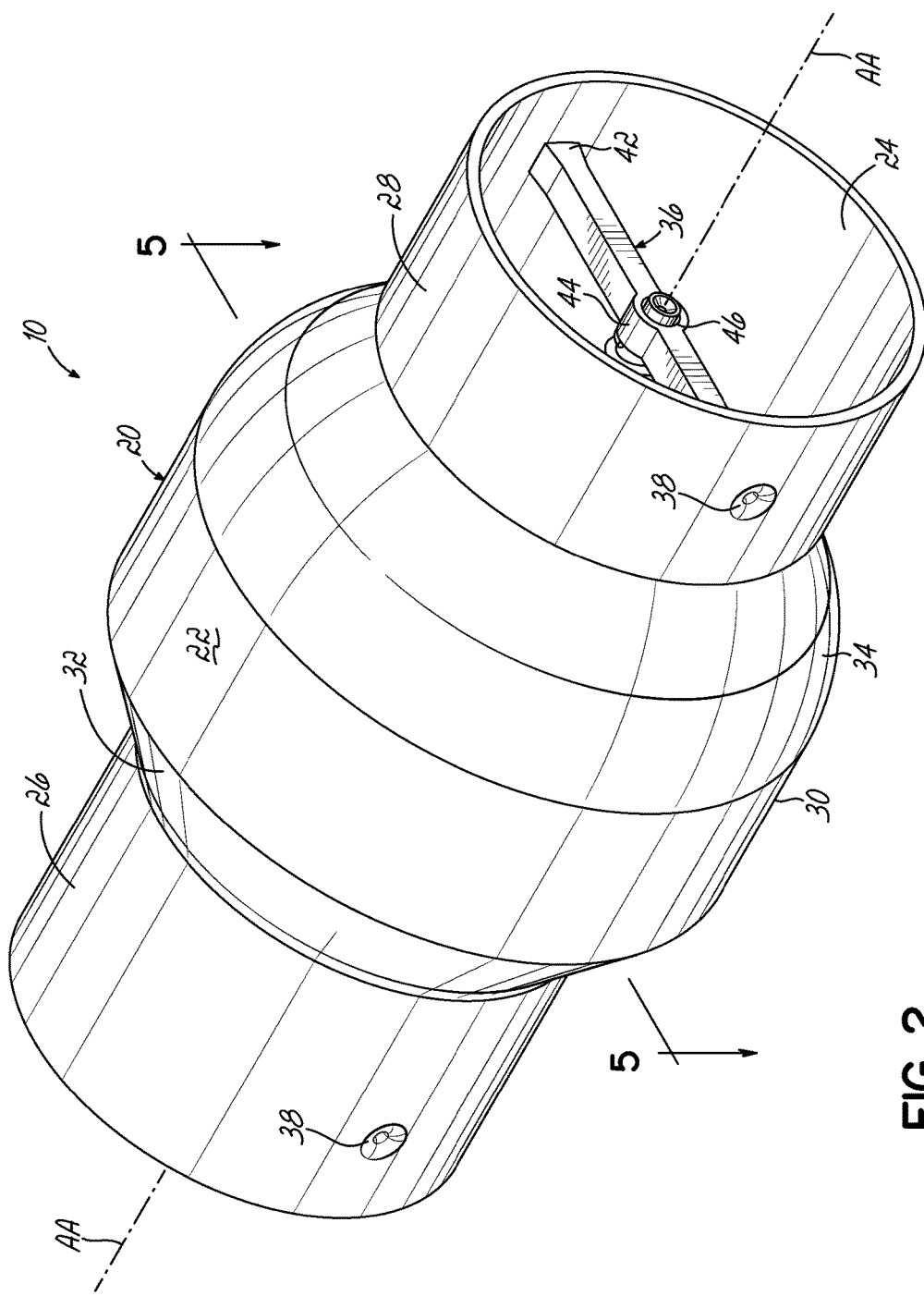
FIG. 2 is a perspective view of the exhaust valve assembly in accordance with the principles of the present invention.

With reference to FIG. 2, there is shown an exhaust valve assembly 10 in accordance with the present invention. FIG. 1 illustrates different locations in the exhaust system of a motor vehicle 12 in which an exhaust valve assembly 10 may be placed. However, the exhaust valve assembly of the present invention may be used in any type of exhaust system for a motor vehicle. The exhaust system shown in FIG. 1 is merely illustrative and not intended to be limiting. Additionally, the exhaust valve assembly of the present invention may be used in any exhaust system, such as in a marine exhaust system. The exhaust valve assembly of the present invention is not limited to use with a motor vehicle exhaust system.

Referring to FIG. 1, locations A show exhaust valve assemblies immediately behind catalytic converters 14. Alternatively, exhaust valve assemblies may be located behind a crossover pipe 15 in locations B or inside a muffler 16 at location C or downstream of the muffler 16 at the rear of the vehicle in locations D.

Figure 3:
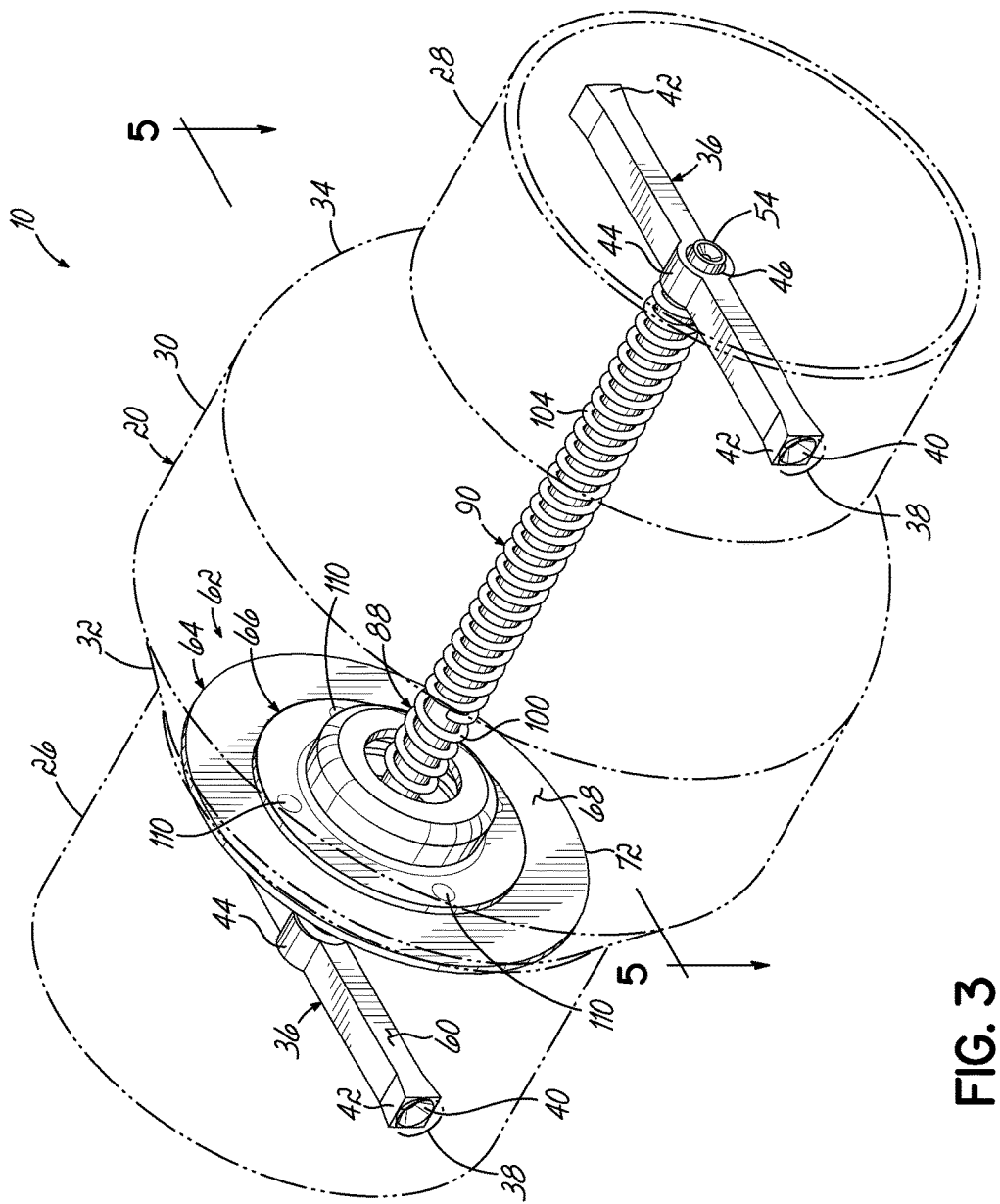
FIG. 3 is a perspective view of the exhaust valve assembly of FIG. 2 wherein the housing is shown in dashed lines.
Figure 5:
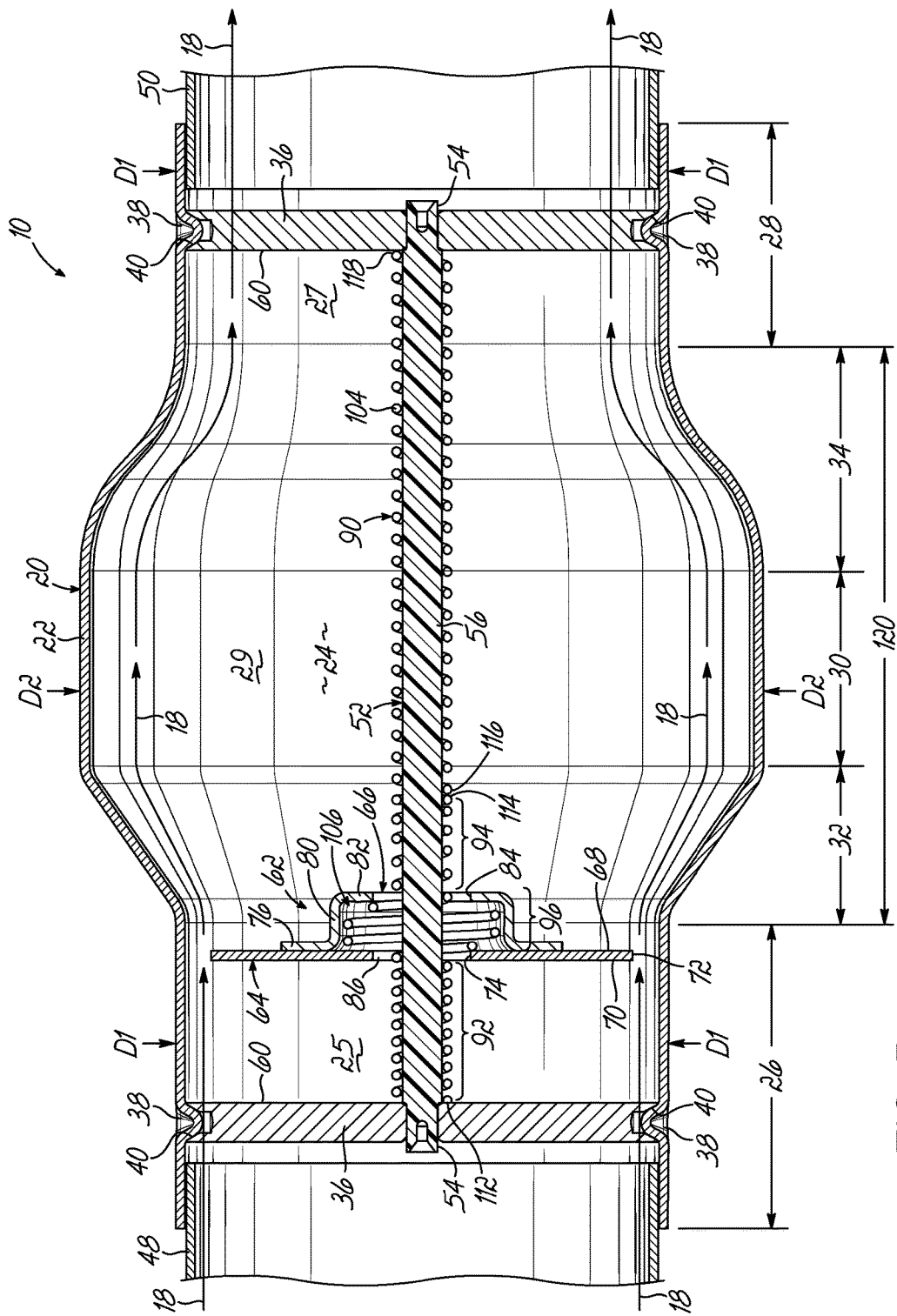
FIG. 5 is a cross-sectional view taken along the line 5-5 of FIG. 2 showing the ram assembly in a closed position.

FIGS. 2, 3 and 5 show the exhaust valve assembly 10 in a first or closed position in which exhaust gases may still pass through the exhaust valve assembly 10 as shown by the arrows 18 in FIG. 5. The exhaust valve assembly 10 comprises a housing 20 made up of a shell 22 having a hollow interior 24. As best shown in FIG. 5, the housing 20 has an inlet portion 26 of a first diameter D1 and an outlet portion 28 of the same diameter D1. However, it is within the contemplation of the present invention that the diameters and/or shapes of the inlet and outlet portions be different. As shown in FIG. 5, the housing 20 also has a middle portion 120, including a central portion 30 of a second diameter D2, greater than the diameter D1 and two tapered portions 32, 34. Between the inlet and central portions 26, 30, the housing 20 has a first or upstream tapered portion 32 which increases in diameter in the downstream direction. Similarly, the housing 20 has a second tapered portion 34 which decreases in diameter in the downstream direction. See FIG. 5. As shown in FIG. 2, the housing 20 has a central axis AA.

The hollow interior 24 of the housing 20 may be considered to have an inlet chamber 25, an outlet chamber 27 and an expansion chamber 29. The expansion chamber 29, having a greater diameter than the inlet and outlet chambers 25, 27 of the interior of the housing 20, allows more exhaust gases to flow through the valve assembly 10.

Figure 6:
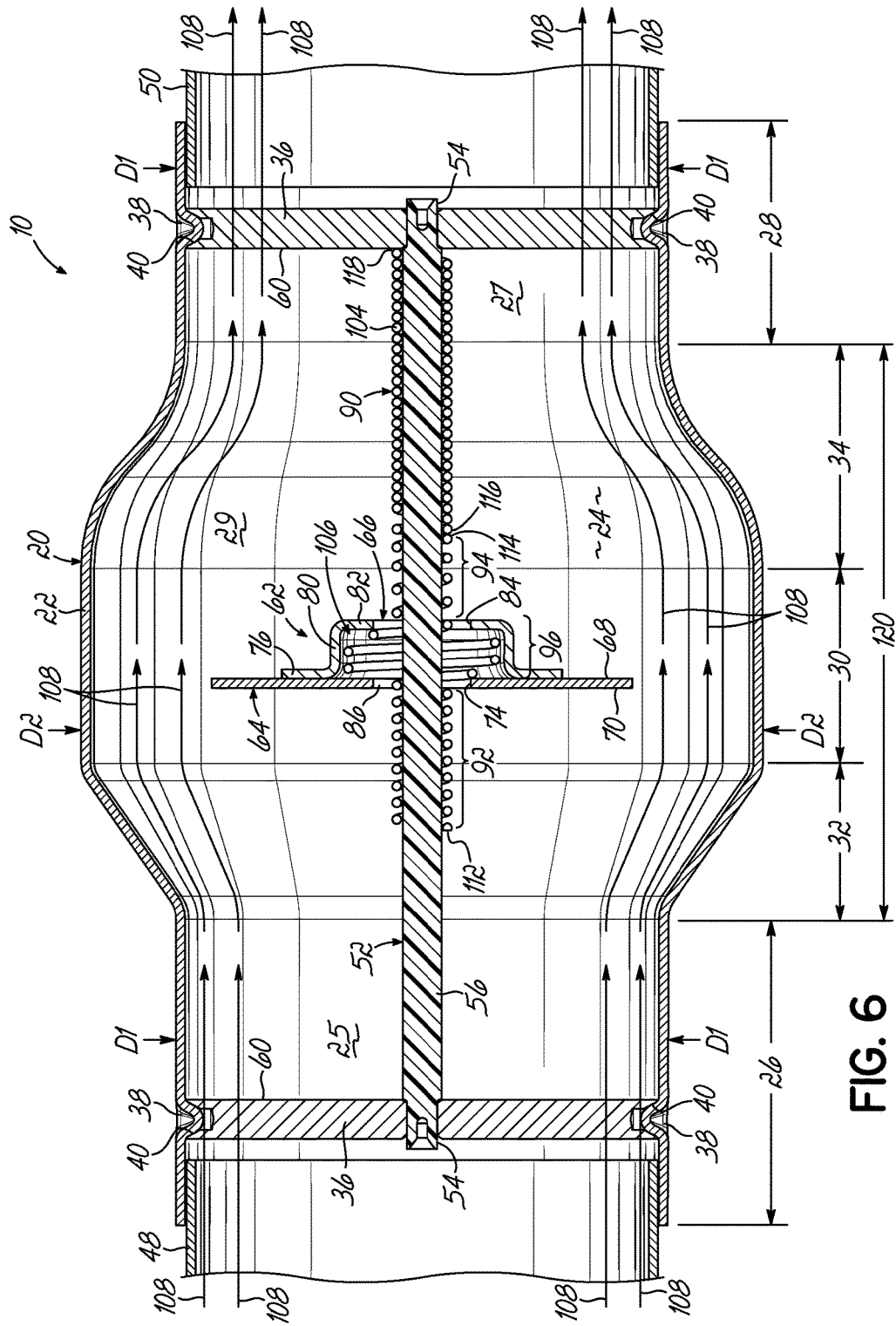
FIG. 6 is a cross-sectional view like FIG. 5 showing the ram assembly in an open position.

Although the housing 20 is illustrated as a unitary body, it may be multiple pieces secured together. However, the unitary body prevents any leaks of exhaust gases. As shown in FIGS. 5 and 6, the inlet portion 26 of housing 20 is sized to allow a first conduit 48 to fit therein and be secured together by any conventional means. Similarly, the outlet portion 28 of housing 20 is sized to allow a second conduit 50 to fit therein and be secured together by any conventional means, such as welding, for example. Although not shown, the first and second conduits 48, 50 may fit outside the inlet and outlet portions 26, 28 of the housing 20, respectively.

Figure 4:
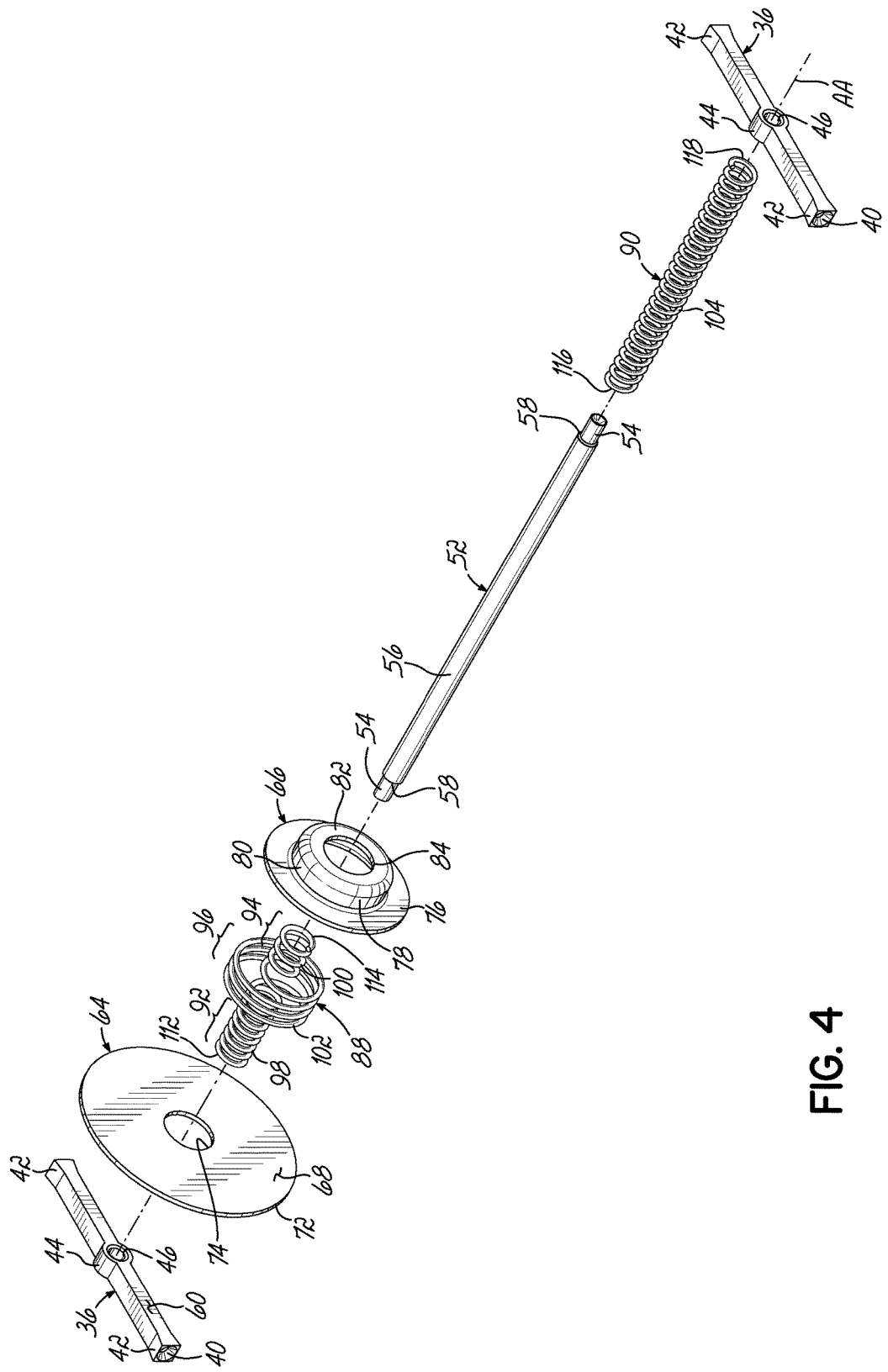
FIG. 4 is an exploded view of a portion of the exhaust valve assembly of FIG. 2.

The exhaust valve assembly 10 further comprises first and second struts 36, each strut 36 being identical. As shown in FIG. 3, the first strut 36 is located in the inlet chamber 25 of the housing interior 24 while a second strut 36 is located in the outlet chamber 27 of housing interior 24. As shown in FIGS. 2, 5 and 6, each strut 36 is held in a stationary position by two dimples 38 formed in the inlet and outlet portions 26, 28 of the housing 20. Each dimple 38 extends radially inwardly into a recess 40 formed in an end of the strut 36. As shown in FIGS. 3 and 4, each strut 36 is generally linear, but has flared outer portions 42 at each end, one of the recesses 40 being located in each flared outer portion 42. Each strut 36 further has a middle portion 44 with an opening 46. The central axis AA of the housing 20 passes through the center of the openings 46 of the middle portions 44 of the struts 36. Although one configuration of strut designed to minimize interference with the flow of exhaust gases through the exhaust valve assembly 10 is illustrated, other configurations of struts or strut mounting mechanisms may be used without departing from the spirit of the invention.

As shown in FIGS. 4, 5 and 6, the exhaust valve assembly 10 further comprises a ride shaft 52 having two end portions 54 and a central portion 56, the diameter of each of the end portions 54 being less than the diameter of the remainder of the ride shaft 52. The end portions 54 of the ride shaft 52 extend through the openings 46 in the struts 36. A shoulder 58, where an end portion 54 and the central portion 56 meet, at each end of the ride shaft 52 abuts an inside surface 60 of each strut 36 when the valve assembly 10 is assembled. The ride shaft 52 in one embodiment is solid metal, but in other embodiments, the ride shaft 52 may be partially or entirely hollow. Although not shown, the end portions of the ride shaft may be secured to the struts 36 in any known manner. For example, the end portions of the ride shaft may be threaded into threaded openings in the struts. When assembled, the ride shaft 52 is co-axial with the central axis AA of the housing 20. In the illustrated embodiment, the struts 36 and ride shaft 52 are stationary. However, it is possible that one or more of the struts and/or ride shaft may be slightly movable.

A movable ram assembly 62 allows variation in the volume of exhaust gases passing through the interior 24 of the housing 20. The ram assembly 62 comprises a ram or exhaust plate 64 and a retainer 66 joined together. As shown in FIG. 3, in one embodiment, the retainer 66 is spot welded at four locations 110 to a downstream surface 68 of the ram plate 64. As shown in FIGS. 5 and 6, ram plate 64 also has an upstream surface 70, a circular perimeter 72 and a circular central opening 74. In the illustrated embodiment, the ram plate 64 is generally planar and has a disk shape. However, the ram plate may be other shapes, including a parabolic dish shape. The retainer 66 has a mounting flange 76 and a cup 78. The cup 78 has a continuous sidewall 80 and a bottom 82, the bottom 82 having a circular opening 84 therethrough. As shown in FIGS. 5 and 6, upon assembly, the ride shaft 52 passes through the aligned openings 84, 74 of the retainer 66 and ram plate 64, respectively. In this regard, the ram assembly 62 is considered to have a central opening 86.

The last two components of the exhaust valve assembly 10 comprise inlet and outlet springs 88, 90, respectively. The inlet spring 88 is made of one piece of wire and has three sections, an upstream section 92, a downstream section 94 and a middle section 96. The diameter of the convolutions 98 of the upstream section 92 is identical to the diameter of the convolutions 100 of the downstream section 94. However, the upstream section 92 has more convolutions than the downstream section 94 and, hence, is greater in length. The convolutions 102 of the middle section 96 have the same diameter which is greater than the diameter of the convolutions 98, 100 of the upstream and downstream sections 92, 94, respectively. The middle section 96 of the inlet spring 88 isolates the ram assembly from the guide shaft, creating a vibration absorbing suspension system.

The outlet spring 90 comprises multiple convolutions 104 of the same diameter as the convolutions 98, 100 of the upstream and downstream sections 92, 94, respectively, of the inlet spring 88. Upon assembly, the ride shaft 52 extends through all of the convolutions of both the inlet and outlet springs 88, 90, respectively. The middle section 96 of the inlet spring 88 is located in a recess 106 between the retainer 66 and ram plate 64. More specifically, the middle section 96 of the inlet spring 88 is sandwiched between the bottom 82 of retainer 66 and the downstream surface 68 of ram plate 64. During the assembly process, the middle section 96 of the inlet spring 88 is compressed before the retainer 66 is welded to the ram plate 64. Thus, the convolutions 102 of the middle section 96 of the inlet spring 88 remain in a compressed condition in the recess 106 of the ram assembly 62 regardless of the position of the ram assembly 62.

When fully assembled, as shown in FIGS. 5 and 6, an upstream end 112 of the inlet spring 88 abuts the middle portion 44 of strut 36 in the inlet chamber 25 of the housing interior 24. The downstream end 114 of the inlet spring 88 abuts an upstream end 116 of the outlet spring 90. The downstream end 118 of the outlet spring 90 abuts the middle portion 44 of the strut 36 in the outlet chamber 29 of the housing interior 24.

In use, the ram plate 64 of the ram assembly 62 resides in the inlet chamber 25 of the hollow interior 24 when the engine is at idle or at low speed (low rpms). The inlet and outlet springs 88, 90 are in a slightly compressed condition, maintaining the ram plate 64 in a first or upstream position shown in FIG. 5. The size of the ram plate 64 and configuration and size of the housing 20 allow exhaust gases to flow downstream in the direction of arrows 18 of FIG. 5. The exhaust gases pass around the ram plate 64 between the ram plate 64 and housing 20.

When the engine speed increases, more exhaust gases flow downstream through the first conduit 48 and into the exhaust valve assembly 10 of the present invention. When the pressure exerted by these flowing exhaust gases on the upstream surface 70 of the ram plate 64 reaches a threshold level, the outlet spring 90 compresses while the inlet spring 88 slightly expands, thereby moving the ram assembly 62 downstream. The ram plate 64 moves downstream to a second position shown in FIG. 6 in which the ram plate 64 is in the expansion chamber 29 of the housing interior 24. Due to the configuration of the tapered portion 32 of the housing 20, when the ram plate 64 moves to its second position shown in FIG. 6, the distance between the perimeter of the ram plate 64 and the housing increases, allowing more flow of exhaust gases through the exhaust valve assembly 10, shown by the arrows 108 shown in FIG. 6.

When the engine speed slows, the pressure on the ram plate 64 decreases. When the pressure on the ram plate from the exhaust gases is less that the force exerted upstream by the outlet spring 90, the ram assembly 62 moves upstream from its second position in the expansion chamber 29 of the housing interior 24 to its first position in the inlet chamber 25 of the housing interior 24. The inlet spring 88 provides a dampening effect when the valve assembly closes or is located in its first position to prevent undesirable noise. In the illustrated embodiment, the ram assembly 62 is oriented the same way, regardless of its position inside the housing interior. However, it is possible that the ram assembly, or a portion thereof, spin or turn as it moves inside the housing interior.

While the present invention has been illustrated by the description of embodiments thereof, and while the embodiments have been described in considerable detail, it is not intended to restrict or in any way limit the scope of the appended claims to such detail. Additional advantages and modifications will readily appear to those skilled in the art. For example, the struts may be a different configuration.

The invention in its broader aspects is, therefore, not limited to the specific details, representative apparatus and method, and illustrative examples shown and described. Accordingly, departures may be made from such details without departing from the spirit or scope of the general inventive concept.

Having described the invention, what is claimed is:

1. An exhaust valve assembly comprising:
a housing having a central axis, inlet and outlet portions and a middle portion between the inlet and outlet portions;
a first strut located in the inlet portion of the housing and a second strut located in the outlet portion of the housing;
a ride shaft extending between the struts inside the housing;
a ram assembly movably mounted on the ride shaft, the ram assembly comprising a ram plate and a retainer secured to the ram plate, the ram plate and retainer having aligned openings, the ride shaft passing through the aligned openings of the ram plate and retainer;
an inlet spring surrounding the ride shaft and having end portions and a middle portion, each portion of the inlet spring having multiple convolutions, the convolutions of the end portions having a diameter less than the diameter of the convolutions of the middle portion, the middle portion of the inlet spring being sandwiched between the ram plate and the retainer wherein the convolutions of the middle portion of the inlet spring are located in a recess between the ram plate and retainer regardless of the position of the ram assembly; and
an outlet spring surrounding the ride shaft downstream of the inlet spring,
wherein the ram assembly is maintained in a first position in the housing, the perimeter of the ram plate being spaced from the inlet portion of the housing to allow exhaust gases to pass through the valve assembly until pressure on the ram plate moves the ram assembly to a second position downstream of the first position inside the housing, thereby allowing additional exhaust gases to move through the housing.

2. The assembly of claim 1 wherein the ram plate and the retainer are welded together.

3. The assembly of claim 2 wherein the convolutions of the middle portion of the inlet spring are compressed regardless of the position of the ram assembly.

4. The assembly of claim 1 wherein each of the struts is fixedly secured to the housing.

5. The assembly of claim 1 wherein the ram plate is disk-shaped.

6. The assembly of claim 1 wherein the ride shaft extends along the central axis of the housing.

7. An exhaust valve assembly comprising:
a housing having a hollow interior and a central axis;
at least one strut located in the housing interior;
a ride shaft supported by the at least one strut inside the interior of the housing;
a ram assembly comprising a ram plate and a retainer secured together, the ride shaft extending through the ram assembly;
an inlet spring having end portions and a middle portion, the convolutions of the end portions having a diameter less than the diameter of the convolutions of the middle portion;
an outlet spring, the inlet spring extending between one of the struts in the housing interior and the outlet spring, the middle portion of the inlet spring being sandwiched between the ram plate and the retainer, the outlet spring abutting the inlet spring at one end and a second strut in the housing interior at a downstream end of the housing, the ride shaft passing through both springs,
wherein the ram assembly is maintained in a first position in the housing interior by at least one of the springs, the ram assembly allowing some exhaust gases to pass through the valve assembly until force on the ram assembly from the exhaust gases moves the ram assembly downstream inside the housing interior, allowing more exhaust gases to move through the valve assembly.

8. The assembly of claim 7 wherein the ram plate remains generally perpendicular to the central axis of the housing.

9. The assembly of claim 7 wherein the housing has inlet and outlet portions of a first diameter and a middle portion of a second diameter greater than the diameter of the inlet and outlet portions, the housing being tapered between the middle portion and the inlet and outlet portions.

10. The assembly of claim 7 wherein each of the struts is fixedly secured to the housing.

11. The assembly of claim 7 wherein the ram plate is disk-shaped.

12. The assembly of claim 7 wherein the retainer has a mounting flange and a cup, the cup having a bottom having an opening through which the ride shaft passes.

13. An exhaust valve assembly comprising:
a housing having a central axis and a hollow interior;
a first strut located in an inlet chamber of the housing interior and a second strut located in an outlet chamber of the housing interior;
a ride shaft extending between the struts inside the housing interior coaxial with the central axis of the housing;
a ram assembly comprising a ram plate and a retainer, the retainer having a mounting flange and a cup, the ram plate being welded to the mounting flange of the retainer, the ride shaft extending through the ram assembly;

an inlet spring surrounding the ride shaft and having end portions and a middle portion, the convolutions of the end portions having a diameter less than the diameter of the convolutions of the middle portion, the convolutions of the middle portion of the inlet spring being located in a recess between the ram plate and the retainer; and an outlet spring surrounding the ride shaft, wherein the ram assembly is maintained in a first position in the inlet chamber of the housing interior, the perimeter of the ram plate being spaced from a wall of the housing until pressure on the ram plate from exhaust gases compresses the outlet spring and moves the ram assembly downstream inside the interior of the housing, thereby allowing additional exhaust gases to move through the interior of the housing.

14. The assembly of claim 13 wherein the outlet spring has an upstream end abutting a downsteam end of the inlet spring and a downstream end abutting the second strut.

15. The assembly of claim 13 wherein the outlet spring has a greater length than the length of the inlet spring.

16. The assembly of claim 13 wherein each of the struts is fixedly secured to the housing.

17. The assembly of claim 13 wherein the inlet and outlet portions of the housing have a first diameter and a middle portion of the housing has a second diameter, the housing having tapered portions between the middle portion and the inlet and outlet portions.

18. The assembly of claim 13 wherein the convolutions of the end portions of the inlet spring have the same diameter.

19. The assembly of claim 13 wherein the convolutions of the middle portion of the inlet spring are compressed between the ram plate and the retainer.

20. The assembly of claim 13 wherein the convolutions of the outlet spring are the same diameter.

* * * * *